United States Patent

[11] 3,585,793

[72] Inventors Philip Rodney Kellner
Greenford;
Derek Seymour Allam, Cranleigh, both of, England
[21] Appl. No. 874,989
[22] Filed Nov. 7, 1969
[45] Patented June 22, 1971
[73] Assignee S. Davall & Sons Limited
Greenford, England
[32] Priority Nov. 12, 1968
[33] Great Britain
[31] 53582/68

[54] ELECTRIC TIMING DEVICES
6 Claims, 3 Drawing Figs.
[52] U.S. Cl. .................................................. 58/1
[51] Int. Cl. .................................................. G04f 1/00, G04f 11/00
[50] Field of Search ............................................ 204/195; 58/236, 1, 144

[56] References Cited
UNITED STATES PATENTS
| | | | |
|---|---|---|---|
| 2,397,844 | 4/1946 | Dewhurst | 58/1 X |
| 2,791,473 | 5/1957 | Mattox | 58/1 X |

FOREIGN PATENTS
| | | | |
|---|---|---|---|
| 540,583 | 5/1957 | Canada | 58/1 |

*Primary Examiner*—Richard B. Wilkinson
*Assistant Examiner*—Stanley A. Wal
*Attorney*—Mawhinney & Mawhinney

ABSTRACT: A sealed glass cell contains a solution of silver perchlorate in pyridine with other additions as an electrolyte. A hollow platinum cathode attached to an end cap projects through the cell wall at one end and a long silver cathode attached to an end cap projects through the cell wall at the other end. A glass tube surrounds the cathode. A constant current is passed through the cell which dissolves away the cathode. The length of the cathode measured against a scale on the wall of the cell gives a measure of time.

PATENTED JUN22 1971　　3,585,793

INVENTOR
PHILIP RODNEY KELLNER ET AL
BY Mawhinney & Mawhinney
ATTYS

ELECTRIC TIMING DEVICES

The invention relates to electric timing devices.

The invention provides electric timing apparatus comprising an electrolytic cell having a silver anode, an electrolyte comprising a silver salt dissolved in a nonaqueous liquid and means for providing, in response to the amount of electrolysis which has occurred in the cell, an indication of the time for which the said electrolysis has occurred.

Preferably at least part of the cell walls are made of glass.

Preferably the cathode is made of platinum.

The electrolyte may include silver perchlorate dissolved in pyridine.

Preferably the electrolytic cell is provided with a scale marked in hours and positioned and arranged so that the length of the anode can be compared with the scale and the time for which a predetermined current has passed through the cell can be determined.

Preferably the electrolytic cell is connected to a source of substantially constant current.

An embodiment of the invention will now be described by way of example and with reference to the accompanying drawings in which.

Figure 1:
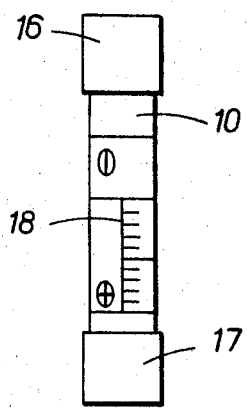
FIG. 1 is a side elevation of an electrolytic cell for use in an electric timing apparatus.
Figure 2:
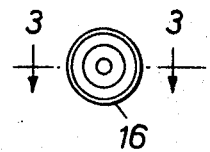
FIG. 2 is an end view of the cell shown in FIG. 1.
Figure 3:
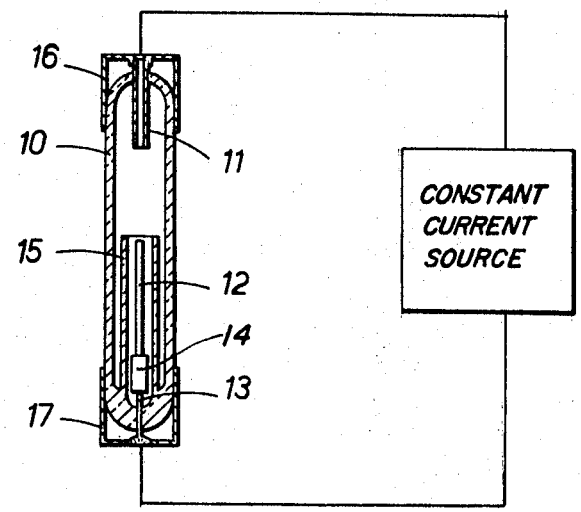
FIG. 3 is a section through the same cell along the line 3-3 of FIG. 2.

In this example an electrolytic cell consists of a glass capsule 10 (FIG. 3) of circular cross section. Projecting through the glass capsule at each end are electrodes 11 and 12. The cathode 11 is in the form of a hollow platinum tube projecting through the glass of the capsule and sealed by the capsule 10 by a glass metal seal. The anode consists of a silver rod 12 and is attached to a platinum rod 13 by a join 14. The platinum rod 13 extends through the glass capsule and is soldered to an end cap 17. A glass metal seal between the capsule wall and the platinum rod 13 isolates the interior of the capsule. Projecting wall 15 also made of glass surrounds the anode. Around each end of the capsule 11 on the outside are fixed end caps 16 and 17 made of brass/electro-tin. Each electrode is electrically connected to its corresponding end cap.

The space within the capsule is filled with a solution of silver perchlorate in pyridine to which is added addition agents and grain-refining agents. The strength of the silver perchlorate solution is between 10 and 100 grams per liter, the perchloric acid between 1 and 60 grams per liter, and the addition and grain-refining agents less than 5 grams per liter.

The electrolytic cell assembly has the external dimensions of a standard 1¼×¼ inch fuse. When the cell is connected by the end caps to an electric supply the silver anode 12 is eroded away in dependence on the charge that passes through the cell. The projecting wall 15 ensures that the anode erodes only at its end nearest the cathode. If the current passing through the cell is approximately constant, then the length of the anode gives a measure of the time for which the current has been passing through the cell. The cell is designed to work on a certain constant current and a scale 18 is provided on the wall of the capsule and is graduated in hours.

The electric timing apparatus of this example may be connected in series with a resistor having a resistance much larger than the resistance of the cell and having a known resistance variation with temperature characteristic. Temperature compensation could then be effected to some extent by varying the voltage in accordance with that characteristic so that the current through the cell and series resistor remained substantially constant.

It is also possible to use apparatus such as has been described, to act as a counter to count the number of times that a piece of apparatus is switched on or off. For this purpose a capacitor or suitable transformer is placed in series or in parallel with the appliance employed, which must be either direct current apparatus or have a rectifier in circuit with the transformer. When the apparatus is turned on there will be an induced current surge in the secondary coil of the transformer. The electric timing apparatus of this example when placed in series with the secondary coil and with a diode rectifier, will receive a pulse of current at each time the main apparatus is switched on. A gain or loss will accrue to one of the electrodes whereby, with the electric timing apparatus of this example, there will be provided an indication of the number of times the main apparatus has been switched on.

The indicator may also be used for ordnance timing applications wherein the following electrolytic characteristic is employed i.e., after a known platable mass has been electrolytically removed from a noble metal surface, the anode/cathode resistance within the system will rise abruptly. In conjunction with appropriate electrical circuitry, this phenomenon may be utilized in performing ordnance timing operations.

The invention is not restricted to the details of the foregoing example.

We claim:

1. An electric timing apparatus comprising an electrolytic cell having a silver anode, an electrolyte comprising a silver salt dissolved in a nonaqueous liquid and means for providing, in response to the amount of electrolysis which has occurred in the cell, an indication of the time for which the said electrolysis has occurred.

2. An electric timing device as claimed in claim 1 in which at least part of the cell walls are made of glass.

3. An electric timing device as claimed in claim 1 in which the cathode is made of platinum.

4. An electric timing device as claimed in claim 1 in which the electrolyte includes silver perchlorate dissolved in pyridine.

5. An electric timing device as claimed in claim 1 in which the electrolytic cell is provided with a scale marked in hours and positioned and arranged so that the length of the anode can be compared with the scale and the time for which a predetermined current has passed through the cell can be determined.

6. An electric timing device as claimed in claim 5 in which the electrolytic cell is connected to a source of substantially constant current.